US012675012B2

(12) United States Patent
Jiang et al.

(10) Patent No.: US 12,675,012 B2
(45) Date of Patent: Jul. 7, 2026

(54) LIGHT CONTROL PANEL, DISPLAY MODULE, AND DISPLAY APPARATUS

(71) Applicants: Hefei BOE Display Technology Co., Ltd., Hefei (CN); BOE TECHNOLOGY GROUP CO., LTD., Beijing (CN)

(72) Inventors: Xiaoting Jiang, Beijing (CN); Ke Dai, Beijing (CN); Haipeng Yang, Beijing (CN); Chunxu Zhang, Beijing (CN); Min Cheng, Beijing (CN); Zhou Rui, Beijing (CN)

(73) Assignees: Hefei BOE Display Technology Co., Ltd., Hefei (CN); BOE TECHNOLOGY GROUP CO., LTD., Beijing (CN)

( * ) Notice: Subject to any disclaimer, the term of this patent is extended or adjusted under 35 U.S.C. 154(b) by 211 days.

(21) Appl. No.: 18/598,071

(22) Filed: Mar. 7, 2024

(65) Prior Publication Data

US 2024/0210750 A1 Jun. 27, 2024

Related U.S. Application Data

(63) Continuation of application No. 17/800,574, filed as application No. PCT/CN2021/124943 on Oct. 20, 2021, now Pat. No. 11,960,163.

(30) Foreign Application Priority Data

Nov. 25, 2020 (CN) .......................... 202011341786.5

(51) Int. Cl.
*G02F 1/1335* (2006.01)
*G02F 1/1333* (2006.01)
(Continued)

(52) U.S. Cl.
CPC .. *G02F 1/133512* (2013.01); *G02F 1/133388* (2021.01); *G02F 1/134309* (2013.01);
(Continued)

(58) Field of Classification Search
None
See application file for complete search history.

(56) References Cited

U.S. PATENT DOCUMENTS

2003/0098937 A1 5/2003 Lee et al.
2008/0218667 A1* 9/2008 Tago ................. G02F 1/133371
349/106
(Continued)

FOREIGN PATENT DOCUMENTS

CN 103926742 A 7/2014
CN 205539837 U 8/2016
(Continued)

OTHER PUBLICATIONS

China Patent Office, CN202011341786.5, First Office Action issued on Oct. 28, 2024.
(Continued)

*Primary Examiner* — Shan Liu
(74) *Attorney, Agent, or Firm* — HOUTTEMAN LAW LLC

(57) ABSTRACT

A light control panel, having a dimming area and a peripheral area surrounding the dimming area; wherein the light control panel includes a first substrate and a second substrate oppositely disposed, and a first liquid crystal layer therebetween; the first substrate includes a signal connecting line on the first base substrate; the signal connecting line includes a first signal sub-line and a second signal sub-line which are electrically connected together and in different layers; a connecting position between the first signal sub-line and the second signal sub-line is in the peripheral area; and the slot
(Continued)

at a position corresponding to the connecting position between the first signal sub-line and the second signal sub-line is formed with a protrusion, and an orthographic projection of the slot on the first base substrate overlaps an orthographic projection of the first signal sub-line on the first base substrate.

19 Claims, 9 Drawing Sheets

(51) Int. Cl.
  *G02F 1/1343* (2006.01)
  *G02F 1/1347* (2006.01)
  *G02F 1/1362* (2006.01)
  *G02F 1/1368* (2006.01)

(52) U.S. Cl.
  CPC ...... *G02F 1/1347* (2013.01); *G02F 1/136227* (2013.01); *G02F 1/136286* (2013.01); *G02F 1/1368* (2013.01); *G02F 2202/16* (2013.01); *G02F 2203/48* (2013.01)

(56) References Cited

U.S. PATENT DOCUMENTS

| | | | |
|---|---|---|---|
| 2017/0139263 A1 | 5/2017 | Jin | |
| 2018/0188616 A1* | 7/2018 | Jeong | ..................... G02F 1/136 |
| 2018/0307079 A1* | 10/2018 | Chen | ..................... G02F 1/1339 |
| 2020/0117032 A1* | 4/2020 | Chan | ................... G02F 1/13306 |
| 2020/0264463 A1 | 8/2020 | Chen et al. | |

FOREIGN PATENT DOCUMENTS

| | | | |
|---|---|---|---|
| CN | 106249464 A | 12/2016 | |
| CN | 106990590 A | 7/2017 | |
| CN | 108873461 A | 11/2018 | |
| CN | 108873520 A | 11/2018 | |
| CN | 110673411 A | 1/2020 | |
| CN | 110780500 A | 2/2020 | |
| CN | 111061098 A | 4/2020 | |
| CN | 210428032 U | 4/2020 | |
| CN | 111736393 A | 10/2020 | |
| CN | 214586331 U | 11/2021 | |
| JP | 2008233149 A | 10/2008 | |
| WO | WO-2019210629 A1 * | 11/2019 | ....... G02F 1/133512 |

OTHER PUBLICATIONS

WIPO, International Search Report issued on Dec. 23, 2021.
USPTO, U.S. Appl. No. 17/800,574 First Office Action issued on Sep. 26, 2023.
USPTO, U.S. Appl. No. 17/800,574 Notice of Allowance issued on Jan. 22, 2024.

* cited by examiner

BM1

BM1

300

BM1

LIGHT CONTROL PANEL, DISPLAY MODULE, AND DISPLAY APPARATUS

CROSS-REFERENCE TO RELATED APPLICATION

This is a continuation application of a National Phase application Ser. No. 17/800,574 entitled "DISPLAY MODULE AND DISPLAY APPARATUS" filed on Aug. 18, 2022, which is filed under 35 U.S.C. 371 as a national stage of PCT/CN2021/124943 filed on Oct. 20, 2021, an application claiming the benefit of Chinese Application No. 202011341786.5 filed on Nov. 25, 2020, the content of each of which is hereby incorporated by reference in its entirety.

TECHNICAL FIELD

The present disclosure belongs to the technical field of display, and particularly relates to a light control panel, a display module, and a display apparatus.

BACKGROUND

With continuous development of display technologies, various technologies may be adopted in the industry to improve a contrast of a display screen, and one of the technologies is a dual cell local dimming technology. At present, a display apparatus adopting a dual cell local dimming technology generally includes a light control panel and a display panel, wherein the light control panel is in black and white display to control a display brightness of different areas, and the display panel is in common normal display. By adopting the dual cell local dimming technology, a contrast of a display picture may be improved to greater than 100000 from the original value 1000, so that the contrast of the display picture can be significantly improved, a display effect is improved, and a user experience is improved.

SUMMARY

The present disclosure aims to solve at least one technical problem in the prior art and provides a light control panel, a display module, and a display apparatus.

In a first aspect, a light control panel according to an embodiment of the present disclosure is provided with a dimming area and a peripheral area surrounding the dimming area; the light control panel includes a first substrate and a second substrate opposite to each other, and a first liquid crystal layer between the first substrate and the second substrate, wherein the first substrate includes:
a first base substrate; and
a signal transmission line, which is on a side of the first base substrate close to the first liquid crystal layer and is in the peripheral area,
the second substrate includes:
a second base substrate; and
a first black matrix layer, which is on a side of the second base substrate close to the first liquid crystal layer and is in the dimming area and the peripheral area,
wherein the first black matrix layer is provided with a slot in the peripheral area, and an orthographic projection of at least a part of the slot on the first base substrate is on a side of an orthographic projection of the signal transmission line on the first base substrate, close to the dimming area, wherein the first substrate further includes a signal connecting line on the first base substrate; the signal connecting line includes a first signal sub-line and a second signal sub-line which are electrically connected together and in different layers; a connecting position between the first signal sub-line and the second signal sub-line is in the peripheral area; and the slot at a position corresponding to the connecting position between the first signal sub-line and the second signal sub-line is formed with a protrusion, and an orthographic projection of the slot on the first base substrate overlaps an orthographic projection of the first signal sub-line on the first base substrate.

The slot includes a continuous pattern surrounding the dimming area.

The first black matrix layer is provided with at least one of the slot, the signal transmission line is around the dimming area, the dimming area includes a first side and a second side opposite to each other in a first direction, and a third side and a fourth side opposite to each other in a second direction;

each of the at least one slot includes a first slot part and a second slot part opposite to each other in the first direction, and a third slot part and a fourth slot part opposite to each other in the second direction;

a distance between the first slot part of a slot of the at least one slot closest to the dimming area and the first side of the dimming area is equal to a distance between the second slot part of the slot closest to the dimming area and the second side of the dimming area, and the distance is d1;

a minimum distance between the first slot part of the slot closest to the dimming area and the signal transmission line is equal to a minimum distance between the second slot part of the slot closest to the dimming area and the signal transmission line, and the minimum distance is d2;

a distance between the third slot part of the slot closest to the dimming area and the third side of the dimming area is equal to a distance between the fourth slot part of the slot closest to the dimming area and the fourth side of the dimming area, and the distance is d3; and a minimum distance between the third slot part of the slot closest to the dimming area and the signal transmission line is equal to a minimum distance between the fourth slot part of the slot closest to the dimming area and the signal transmission line, and the minimum distance is d4;

wherein $d1:d2=kd3:d4$, and k is greater than 0.8 and less than 1.2.

$d1:d2$ is in a range from 4:1 to 6:1.

The first signal sub-line includes a first common electrode line, and the second signal sub-line includes a first common voltage lead-in line; one end of the first common voltage lead-in line is connected to the first common electrode line, and the other end of the first common voltage lead-in line is connected to a first common electrode; and an orthographic projection of the protrusion on the first base substrate overlaps an orthographic projection of the first common electrode line on the first base substrate.

The signal transmission line includes a first common electrode line.

The first substrate further includes:
a plurality of dimming units and a plurality of redundant dimming units, both of which are on a side of the first base substrate close to the first liquid crystal layer, wherein the plurality of dimming units are in the dimming area, and the plurality of redundant dimming units are in the peripheral area; the plurality of dimming units and the plurality of redundant dimming units include a first thin film transistor, a dimming electrode, and a first common electrode, which are on the first base substrate; and the dimming electrode of the redundant dimming unit is electrically connected to the first common electrode.

An orthographic projection of the slot on the first base substrate overlaps an orthographic projection of the redundant dimming unit on the first base substrate.

The plurality of dimming units and the plurality of redundant dimming units are arranged side by side in a second direction to form a plurality of first dimming unit groups, the dimming units and the redundant dimming units in each of the plurality of first dimming unit groups are arranged in a first direction; the plurality of dimming units and the plurality of redundant dimming units are arranged side by side in a first direction to form a plurality of second dimming unit groups, and the dimming units and the redundant dimming units in each of the plurality of second dimming unit groups are arranged in the second direction; gates of the first thin film transistors of the dimming units and the redundant dimming units in a same first dimming unit group are connected to a same first gate line; the dimming units and the redundant dimming units in a same second dimming unit group are provided with data voltages through two first data lines, and sources of two adjacent first thin film transistors are connected to the two first data lines, respectively;

the first substrate further includes:

a first transparent conductive layer on a side of the first base substrate close to the first liquid crystal layer, wherein the first transparent conductive layer includes the dimming electrode; the dimming electrode includes a plurality of first openings arranged side by side in the second direction, and each of the plurality of first openings extends in the first direction;

a first metal conductive layer on a side of the first base substrate close to the first liquid crystal layer, wherein the first metal conductive layer includes a plurality of first gate lines arranged side by side in the second direction, the gates of the first thin film transistors and the common electrode line, each of the plurality of first gate lines extends in the first direction;

a first gate insulating layer on a side of the first metal conductive layer away from the first base substrate;

an active semiconductor layer on a side of the first gate insulating layer away from the first metal conductive layer, wherein the active semiconductor layer includes an active layer of the respective first thin film transistor;

a second metal conductive layer on a side of the active semiconductor layer away from the first gate insulating layer, wherein the second metal conductive layer includes a plurality of first data lines arranged side by side in the first direction, and a source and a drain of the respective first thin film transistor, and the source and the drain of the respective first thin film transistor are connected to the active layer; and each of the plurality of first data lines extends in the second direction;

a first interlayer insulating layer on a side of the second metal conductive layer away from the first gate insulating layer, wherein the first substrate further includes a first connecting via, a second connecting via and a third connecting via, wherein the first connecting via and the second connecting via each penetrate the first interlayer insulating layer and the first gate insulating layer, and the third connecting via penetrates the first interlayer insulating layer; and a second transparent conductive layer on a side of the first interlayer insulating layer away from the second metal conductive layer, wherein the second transparent conductive layer includes the first common electrodes of a respective dimming unit and a respective redundant dimming unit, and a first connecting electrode; the first connecting electrode electrically connects the drain of the first thin film transistor and the dimming electrode through the first connecting via; and the first common electrode is electrically connected to the first common electrode line through the second connecting via.

The first black matrix layer includes a first light shielding part in the dimming area and a second light shielding part in the peripheral area; and the first light shielding part includes a plurality of light shielding sub-parts arranged side by side in the second direction, each of the plurality of light shielding sub-parts extends in the first direction; and an orthographic projection of each of plurality of light shielding sub-parts on the first base substrate covers an orthographic projection of one of the plurality of first gate lines on the first base substrate.

The dimming electrode further includes a plurality of second openings arranged side by side in the first direction, each of the plurality of second openings extends in the second direction; and an orthographic projection of each of the plurality of first data lines on the first base substrate is within an orthographic projection of one of the plurality of second openings on the first base substrate.

The second transparent conductive layer further includes a plurality of third openings formed in the dimming electrode and arranged side by side in the second direction; each of the plurality of third openings extends in the first direction, and an orthographic projection of the third opening on the first base substrate at least partially overlaps an orthographic projection of the first gate line on the first base substrate.

The first transparent conductive layer further includes a plurality of first connecting parts disposed at intervals, and each of the plurality of first connecting parts is electrically connected to the dimming electrode in the redundant dimming unit and is in a direct lap connection with the first common electrode line.

The first substrate further includes a gate driving circuit on the first base substrate and in the peripheral area, and a plurality of gate signal lead-in lines, a detection signal line, and a compensation signal line, which are connected to the gate driving circuit; each of the plurality of gate signal lead-in lines is connected to one of the plurality of first gate lines; and the detection signal line is connected to one of the plurality of first gate lines;

the first metal conductive layer further includes the detection signal line and the compensation signal line; and the second metal conductive layer further includes the plurality of gate signal lead-in lines.

A second connecting part is connected to an end of the first gate line, and a third connecting part is connected to an end of the gate signal lead-in line; the second transparent conductive layer further includes a second connecting electrode; the first substrate further includes a fourth connecting via penetrating the first gate insulating layer and the first interlayer insulating layer, and a fifth connecting via penetrating the first interlayer insulating layer; the second connecting electrode electrically connects the second connecting part and the third connecting part together through the fourth connecting via and the fifth connecting via.

The first metal conductive layer further includes a redundant gate line extending in a first direction, and the redundant gate line is connected to the first common electrode line; at least one of the plurality of first dimming unit groups includes only the redundant dimming units, and the gate line connected to the gate of the first thin film transistor in this first dimming unit group is connected to the first common electrode line.

A width of the slot is greater than or equal to 18 μm.

The display panel includes a third substrate and a fourth substrate opposite to each other, and a second liquid crystal layer between the third substrate and the fourth substrate; the third substrate is on a side of the second substrate away from the first liquid crystal layer; the display panel is provided with a display area and a non-display area surrounding the display area; and an orthographic projection of the display area on the first base substrate is within an orthographic projection of the dimming area on the first base substrate.

In a second aspect, an embodiment of the present disclosure provides a display module, comprising a display panel and any one of the light control panels described above, which are stacked together.

In a third aspect, an embodiment of the present disclosure provides a display apparatus, which includes any one of the display modules described above.

DETAIL DESCRIPTION OF EMBODIMENTS

In order to enable one of ordinary skill in the art to better understand the technical solutions of the present disclosure, the present disclosure will be further described in detail below with reference to the accompanying drawings and specific embodiments.

Unless defined otherwise, technical or scientific terms used herein shall have the ordinary meaning as understood by one of ordinary skill in the art to which this disclosure belongs. The use of "first," "second," and the like in the present disclosure is not intended to indicate any order, quantity, or importance, but rather serves to distinguish one element from another. Also, the term "a," "an," "the" or the like does not denote a limitation of quantity, but rather denotes the presence of at least one. The word "comprising", "comprises", or the like means that the element or item preceding the word includes the element or item listed after the word and its equivalent, but does not exclude other elements or items. The term "connected", "coupled" or the like is not restricted to a physical or mechanical connection, but may include an electrical connection, whether direct or indirect. The term "upper", "lower", "left", "right", and the like are used only to indicate relative positional relationships, and when the absolute position of the object being described is changed, the relative positional relationships may also be changed accordingly.

Figures 1, 2:
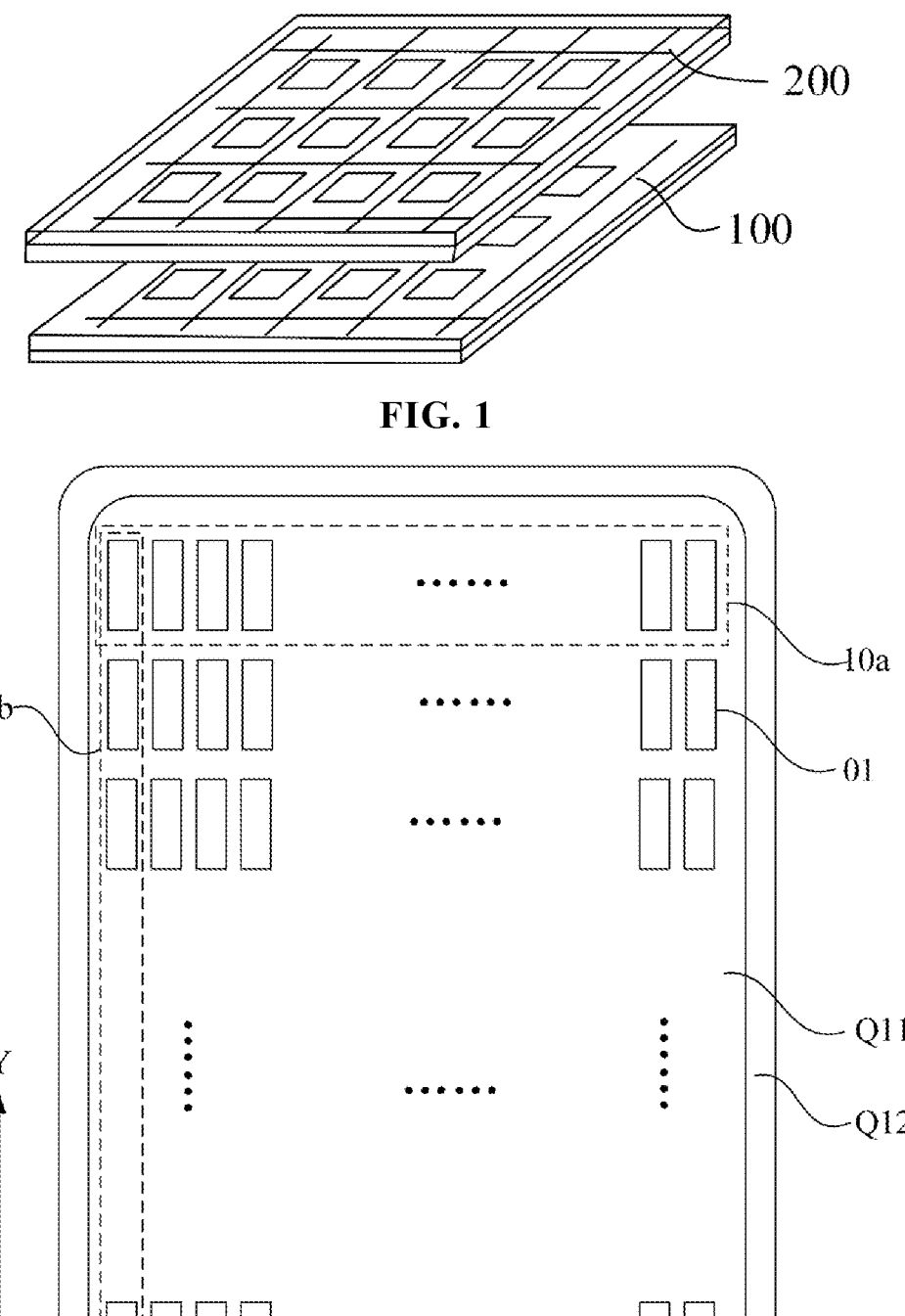
FIG. 1 is a schematic diagram of an exemplary dual liquid crystal cell display module.
FIG. 2 is a schematic diagram of an arrangement of dimming units of a light control panel in the display module shown in FIG. 1.

FIG. 1 is a schematic diagram of an exemplary dual liquid crystal cell display module. As shown in FIG. 1, the display module includes a light control panel 100 and a display panel 200 stacked together. The light control panel 100 is used for controlling a light transmittance of light emitted by a backlight, and the display panel 200 is used for displaying a picture.

Figure 3:
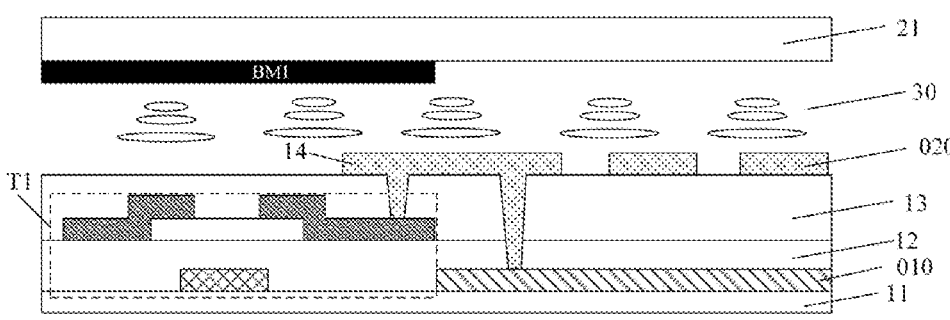
FIG. 3 is a cross-sectional view of a dimming area of the light control panel in the display module shown in FIG. 1.
Figure 4:
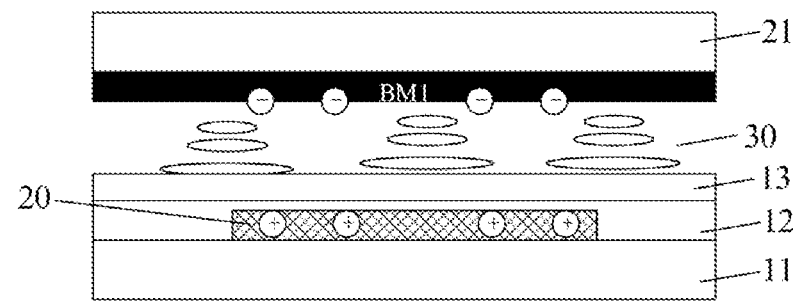
FIG. 4 is a cross-sectional view of a peripheral area of the light control panel in the display module shown in FIG. 1.

FIG. 2 is a schematic diagram of an arrangement of dimming units of a light control panel in the display module shown in FIG. 1; FIG. 3 is a cross-sectional view of a dimming area of the light control panel in the display module shown in FIG. 1; and FIG. 4 is a cross-sectional view of a peripheral area of the light control panel in the display module shown in FIG. 1. As shown in FIGS. 2 to 4, the light control panel 100 has a dimming area Q11 and a peripheral area Q12 surrounding the dimming area Q11. The dimming area Q11 has a dimming component, and the peripheral area Q12 has a signal transmission line for providing a signal for the dimming component. In the following description, the signal transmission line is a first common electrode line 20 as an example, and it should be understood that the signal transmission line is not limited to the first common electrode line 20, and may alternatively include a ground line and the like. Therefore, the signal transmission line being the first common electrode line 20 does not limit the protection scope of the embodiments of the present disclosure.

Specifically, the light control panel 100 includes a first substrate and a second substrate disposed opposite to each other, and a first liquid crystal layer 30 disposed between the first substrate and the second substrate. A first lower polarizer (not shown) is disposed on a side of the first substrate away from the first liquid crystal layer. The first substrate includes a first base substrate 11, a plurality of dimming units 01 disposed on the first base substrate 11 and located in the dimming area Q11, a plurality of redundant dimming units (not shown) disposed on the first base substrate 11 and located in the peripheral area Q12, and a first common electrode line 20. The redundant dimming units are disposed on a side of the first common electrode line 20 close to the dimming area Q11. The dimming unit 01 and the redundant dimming unit may have a same structure, and the redundant dimming unit may be used to repair the dimming unit 01 when there is a failure in the dimming unit Q11. Each of the dimming units 01 and the redundant dimming units may include a first thin film transistor T1, a dimming electrode 010, and a first common electrode 020. The second substrate includes a second base substrate 21, and a first black matrix layer BM1 disposed on the second base substrate 21. The first black matrix layer BM1 has a plurality of first hollow parts located in the dimming area Q11, and each first hollow part corresponds to one dimming electrode 010. For example, the first hollow parts are disposed in a one-to-one correspondence with the dimming electrodes 010, and orthographic projections of the first hollow part and the dimming electrode 010 on the first base substrate 11 completely overlap each other.

With continued reference to FIG. 3, in the first substrate, the dimming electrode 010 and the first common electrode 020 are sequentially disposed on the first base substrate 11. The dimming electrode 010 may be a plate electrode, and the first common electrode 020 may be a slit electrode. Since the light control panel 100 is used to adjust the light transmittance of light emitted from the backlight, and the light control panel 100 may transmit light, the dimming electrode 010 and the first common electrode 020 each are made of a transparent conductive material, for example, indium Tin Oxide (ITO). In addition, since a same voltage may be applied to the first common electrodes 020 of the dimming units 01 and the redundant dimming units during operation, the first common electrodes 020 may have a one-piece structure. The first thin film transistor T1 may be a bottom gate thin film transistor, and a gate thereof is made of a metal conductive material. Since a patterning process (wet etching) of the gate is different from a patterning process (dry etching) of the dimming electrode 010, the gate of the first thin film transistor T1 may be directly formed on a layer where the dimming electrode 010 is located. The first common electrode line 20 may be disposed in a same layer and may be made of a same material as the gate of a respective first thin film transistor T1, that is, the first common electrode line 20 is formed at a same time when the gate of the respective first thin film transistor T1 is formed. A first gate insulating layer 12 is formed on a layer where the gate of the respective first thin film transistor T1 is located. An active layer of the respective first thin film transistor T1 is formed on the first gate insulating layer 12. A respective source and drain are formed on the active layer of the respective first thin film transistor T1. A first interlayer insulating layer 13 is formed on the source and drain of the respective first thin film transistor T1, and a first common electrode 020 is formed on the first interlayer insulating layer 13. In this case, a first connecting electrode 14 may be formed in a layer where the first common electrode 020 is formed, and the first common electrode 020 and the first connecting electrode 14 may be made of a same material, that is, the first common electrode 020 and the first connecting electrode 14 may be formed in one patterning process. A first connecting via penetrating the first gate insulating layer 12 and the first interlayer insulating layer 13, and a third connecting via penetrating the first interlayer insulating layer 13 are further formed in the first substrate, and the first connecting electrode 14 may electrically connect the drain of the first thin film transistor T1 and the dimming electrode 010 to each other through the first connecting via and the second connecting via. It should be noted that the first connecting via and the third connecting via may be formed through one patterning process, and may be independently disposed or may be communicated to each other. In addition, the first substrate further includes a second connecting via penetrating the first gate insulating layer 12 and the first interlayer insulating layer 13, and the first common electrode 020 and the first common electrode line 20 are electrically connected to each other through the second connecting via.

For example, with continued reference to FIG. 2, the dimming units 01 and the redundant dimming units in the first substrate may be arranged in an array to form a plurality of first dimming unit groups 10a arranged side by side in a second direction, and the dimming units 01 and the redundant dimming units in each first dimming unit group 10a are arranged along a first direction. A plurality of second dimming unit groups 10b are simultaneously formed to be arranged side by side in the first direction, and the dimming units 01 and the redundant dimming units in each second dimming unit group 10b are arranged along the second direction. It should be noted that the first direction and the second direction intersect each other, for example, an angle therebetween is 90°, that is, one of the first direction and the second direction is a row direction X, and the other of the first direction and the second direction is a column direction Y. In the embodiments of the present disclosure, the first direction is the row direction X, and the second direction is the column direction Y, as an example for description. In addition, the following description is given by taking as an example that the dimming units 01 and the redundant dimming units in the first substrate may be arranged in an array.

Figure 5:
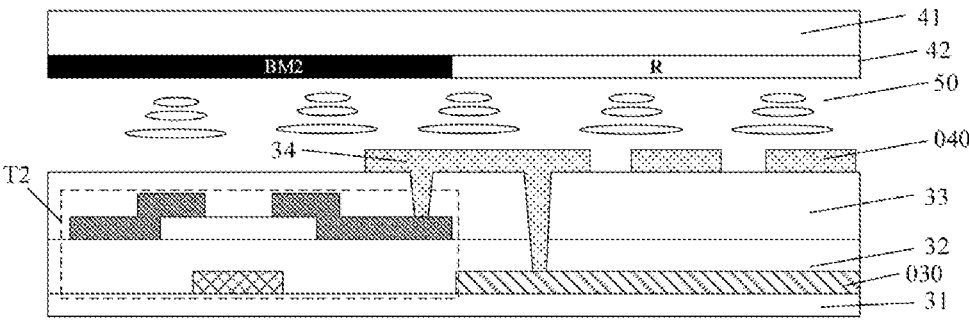
FIG. 5 is a cross-sectional view of a display area of a display panel in the display module shown in FIG. 1.
Figure 6:
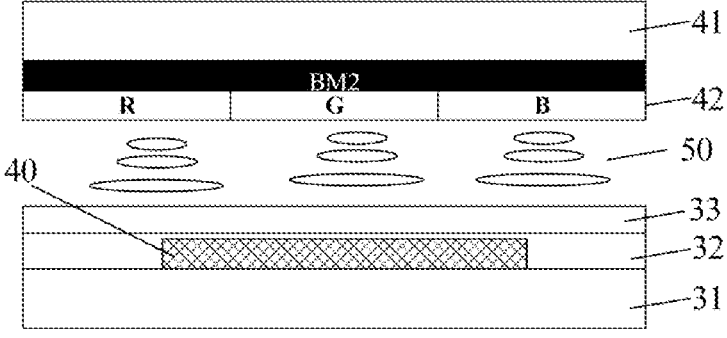
FIG. 6 is a cross-sectional view of a non-display area of the display panel in the display module shown in FIG. 1.

FIG. 5 is a cross-sectional view of a display area of a display panel in the display module shown in FIG. 1; and FIG. 6 is a cross-sectional view of a non-display area of a display panel in the display module shown in FIG. 1. As shown in FIGS. 5 and 6, the display panel 200 has a display area and a non-display area surrounding the display area. The display panel 200 includes a third substrate and a fourth substrate disposed opposite to each other, and a second liquid crystal layer 50 disposed between the third substrate and the fourth substrate. A second lower polarizer (not shown) is formed on a side of the third substrate away from the second liquid crystal layer 50, and a first upper polarizer (not shown) is formed on a side of the fourth substrate away from the liquid crystal layer. Specifically, the third substrate includes a third base substrate 31, and a plurality of sub-pixels disposed on the third base substrate 31 and located in the display area, a second common electrode line 40 disposed on the third substrate 31 and located in the non-display area, and redundant sub-pixels (not shown). Each sub-pixel includes a pixel electrode 030, a second thin film transistor T2, and a second common electrode 040. The pixel electrode 030 in each sub-pixel is electrically connected to a drain of the second thin film transistor T2 through a connecting electrode 34. The redundant sub-pixels are located on a side of the second common electrode line 40 close to the display area. The redundant sub-pixels and the sub-pixels have a same structure, and the redundant sub-pixel is used for repairing the sub-pixel when there is a failure in the sub-pixel. The fourth substrate includes a fourth base substrate 41, a second black matrix layer BM2 disposed on the fourth base substrate 41, and a color filter layer 42. The color filter layer 42 includes color filters of different colors, for example, red color filters R, green color filters G and blue color filters B, the color filters are arranged in a one-to-one correspondence with the sub-pixels and the redundant sub-pixels. The second black matrix layer BM2 has a second hollow part at a position corresponding to the color filter. In addition, each sub-pixel in the display panel 200 may be disposed corresponding to one dimming unit 01 in the light control panel 100, and each redundant sub-pixel may be disposed corresponding to one redundant dimming unit. Alternatively, a plurality of sub-pixels arranged in an array in the display panel 200 may be disposed corresponding to one dimming unit 01 in the light control panel 100, and correspondingly, a plurality of redundant sub-pixels arranged in an array may be disposed corresponding to one redundant dimming unit.

It should be noted that, with reference to FIGS. 5 and 6, in the embodiments of the present disclosure, the second thin film transistor T2 being a bottom gate thin film transistor is taken as an example for description, but the second thin film transistor T2 may alternatively be a top gate thin film transistor, which is not limited in the embodiments of the present disclosure. A second gate insulating layer 32 is disposed between a gate and an active layer of the second thin film transistor T2, and a second interlayer insulating layer 33 is disposed between the pixel electrode and a source and drain of the second thin film transistor T2. In addition, a difference between the display panel 200 and the light control panel 100 is only that the color filter layer 42 and the first upper polarizer are provided in the display panel, and the remaining structures are substantially the same except for the difference in nomenclature, so the structure of the display panel 200 will not be described in detail herein.

Specifically, when a voltage is applied between the first common electrode 020 and the dimming electrode 010 in the first substrate, an electric field is formed between the first common electrode and the dimming electrode 010, so that a deflection angle of liquid crystal molecules in the first liquid crystal layer 300 is controlled, and further, a light transmittance of light emitted by the backlight is controlled.

Figure 7:
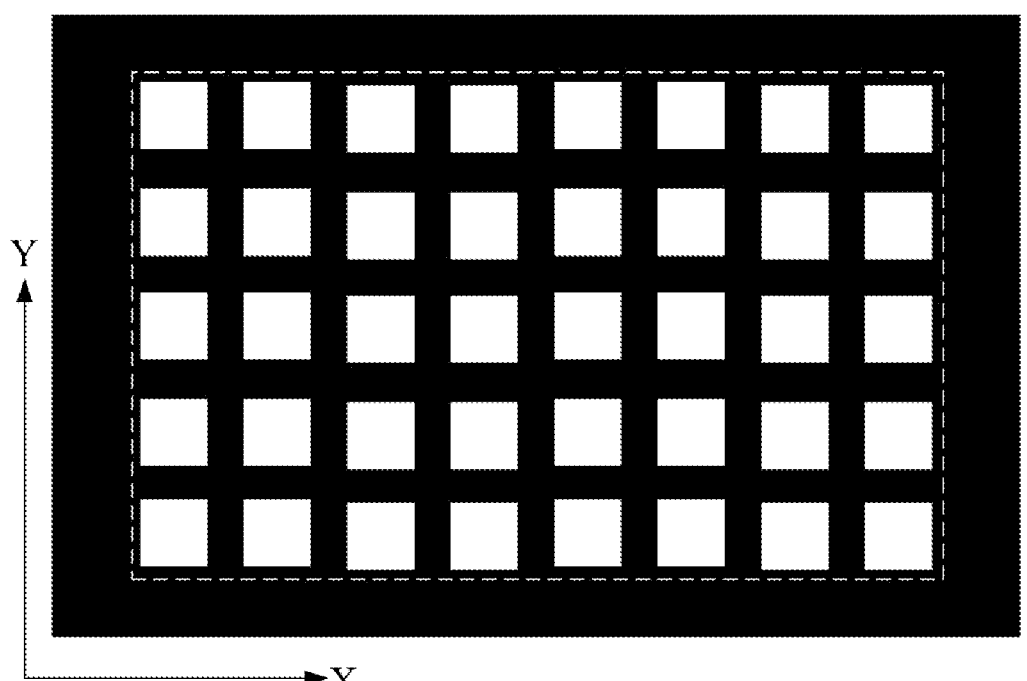
FIG. 7 is a schematic diagram of a first black matrix layer of the light control panel in the display module shown in FIG. 1.

With continued reference to FIGS. 4 and 6, since the light control panel 100 does not have the color filter layer 42 compared with the display panel 200, a distance between the first black matrix layer BM1 and the first common electrode line 20 in the peripheral area Q12 of the light control panel 100 is greater than a distance between the second black matrix layer BM2 and the second common electrode line 40 in the non-display area of the display panel 200. FIG. 7 is a schematic diagram of a first black matrix layer of a light control panel in the display module shown in FIG. 1. As shown in FIG. 7, the first black matrix layer BM1 is in a continuous pattern at a position corresponding to the peripheral area Q12, so as to avoid a problem of light leakage in the peripheral area Q12 of the light control panel 100. The inventor discovers that, because the distance between the first black matrix layer BM1 and the first common electrode line 20 in the peripheral area Q12 of the light control panel is short, and the first black matrix layer BM1 is a continuous pattern at this position, charges on the first common electrode line 20 are easily coupled to the first black matrix layer BM1 and may be conducted to the dimming area Q11, so that the liquid crystal molecules in the dimming area Q11 are abnormally deflected, and a problem that an edge bright line occurs when the display module is turned off appears.

In view of the above problem, a following technical solution is provided in an embodiment of the present disclosure. It should be noted that, in the following description, the signal transmission line being the first common electrode line 20 is taken as an example for description also.

Figure 8:
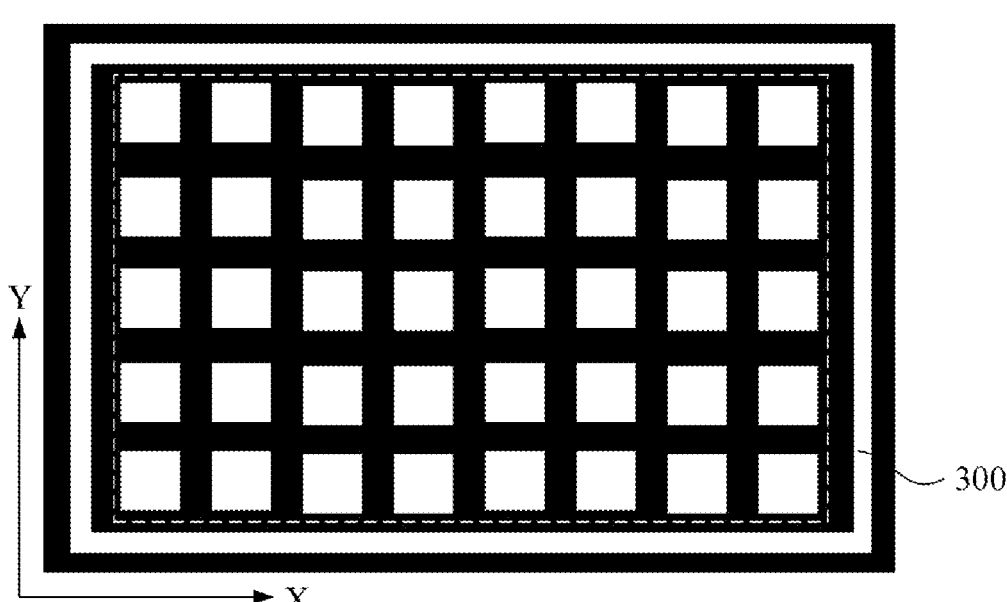
FIG. 8 is a schematic diagram of a first black matrix layer of a light control panel in a display module according to an embodiment of the present disclosure.

In a first aspect, an embodiment of the present disclosure provides a display module, which includes a light control panel 100 and a display panel 200 stacked together. The light control panel 100 and the display panel 200 are substantially the same as the light control panel 100 and the display panel 200 in the display module in FIG. 1, respectively, except for the structure of the first black matrix layer BM1 in the second substrate of the light control panel 100. FIG. 8 is a schematic diagram of a first black matrix layer of a light control panel in a display module according to an embodiment of the present disclosure. As shown in FIG. 8, a peripheral area Q12 of the first black matrix layer BM1 is formed with a slot 300, and an orthographic projection of at least a part of the slot 300 on the first base substrate 11 is located on a side of an orthographic projection of the first common electrode line 20 on the first base substrate 11, close to the dimming area Q11. In this way, charges coupled to the first black matrix layer BM1 by the first common electrode line 20 may be prevented from being conducted to the dimming area Q11 of the second substrate, through the slot 300 in the first black matrix layer BM1, so that the charges coupled to the first black matrix layer BM1 by the first common electrode line 20 may be prevented from influencing an electric field in the dimming area Q11, and then the problem that an edge bright line occurs when the display module is turned off is prevented from appearing.

In some embodiments, with continued reference to FIG. 8, the slot 300 in the first black matrix layer BM1 is a continuous pattern surrounding the dimming area Q11. That is to say, a part of the first black matrix layer BM1 corresponding to the first common electrode line 20 and a part of the first black matrix layer BM1 corresponding to the dimming area Q11 may be separated by the slot 300, which is equivalent to forming an isolation zone between the first common electrode line 20 and the dimming area Q11, so that charges coupled to the first black matrix layer BM1 by the first common electrode line 20 are effectively prevented from being conducted to the dimming area Q11 of the second substrate.

As shown in FIG. 8, if the dimming area Q11 is rectangular, the slot 300 is of a pattern in a rectangular ring. Alternatively, if the dimming area Q11 is circular, the slot 300 may be of a pattern in a circular ring. A shape of the slot 300 is not particularly limited in the embodiments of the present disclosure.

Figure 9:
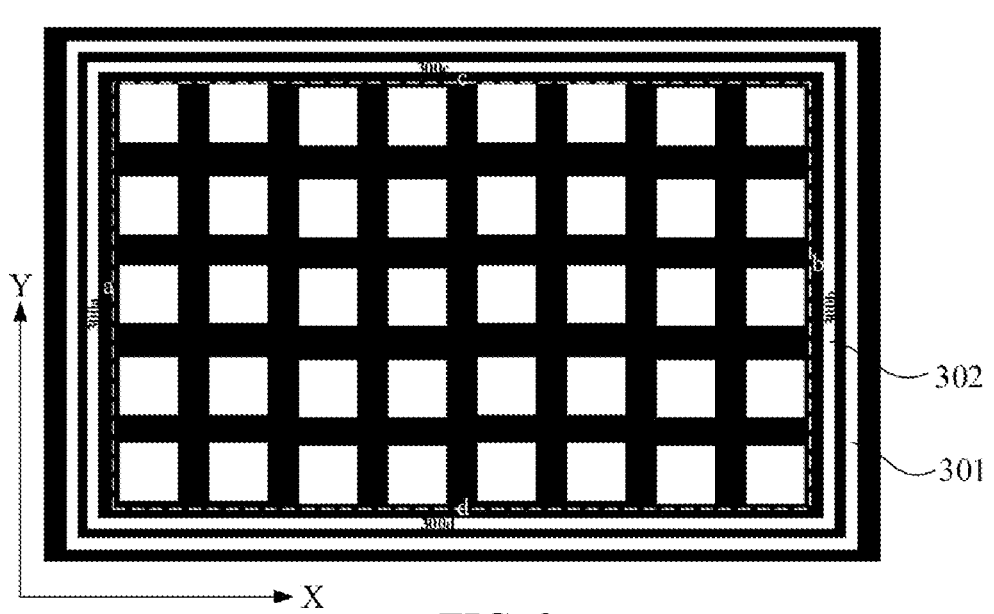
FIG. 9 is a schematic diagram of another first black matrix layer of a light control panel in a display module according to an embodiment of the present disclosure.
Figure 10:
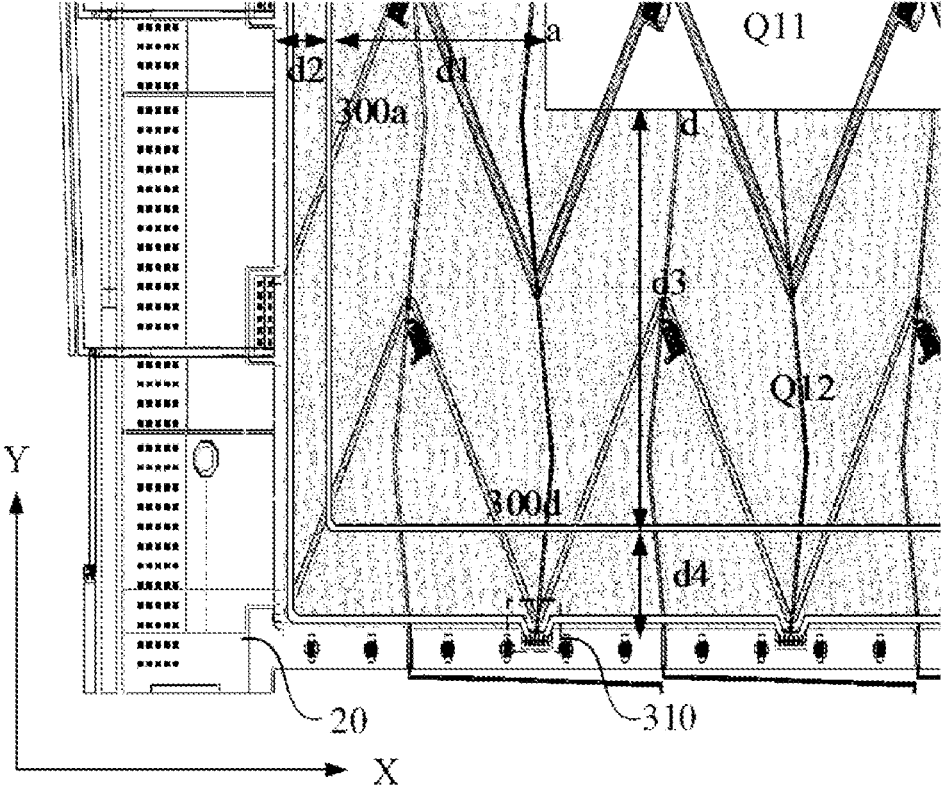
FIG. 10 is a layout of a display module according to an embodiment of the present disclosure.

In some embodiments, the first black matrix layer BM1 may be formed with a plurality of slots 300, such as two, three or even more slots. FIG. 9 is a schematic diagram of another first black matrix layer of the light control panel in the display module according to an embodiment of the present disclosure. As shown in FIG. 9, in the embodiment of the present disclosure, the first black matrix layer BM1 is formed with two slots 300, which are a first slot 301 and a second slot 302, respectively. The second slot 302 is closer to the dimming area Q11 than the first slot 301. The first common electrode line 20 is disposed around the dimming area Q11, and in this case, the first slot 301 and the second slot 302 are both disposed around the dimming area Q11. The dimming area Q11 being a rectangle is taken as an example. The dimming area Q11 includes a first side a and a second side b opposite to each other in the row direction X, and a third side c and a fourth side d opposite to each other in the column direction Y. The first slot 301 and the second slot 302 each include a first slot part 300a and a second slot part 300b opposite to each other in the row direction X, and a third slot part 300c and a fourth slot part 300d opposite to each other in the column direction Y. FIG. 10 is a layout of a display module according to an embodiment of the present disclosure. As shown in FIG. 10, a distance between the first slot part 300a of the second slot 302 and the first side a of the dimming area Q11 is equal to a distance between the second slot part 300b of the second slot 302 and the second side a of the dimming area Q11, and both of them are d1. A minimum distance between the first slot part 300a of the second slot 302 and the first common electrode line 20 is equal to a minimum distance between the second slot part 300a of the second slot 302 and the first common electrode line 20, and both of them are d2. A distance between the third slot part 300c of the second slot 302 and the third side c of the dimming area Q11 is equal to a distance between the fourth slot part 300d of the second slot 302 and the fourth sided of the dimming area Q11, and both of them are d3. A minimum distance between the third slot part 300c of the second slot 302 and the first common electrode line 20 is equal to a minimum distance between the fourth slot part 300d of the second slot 302 and the first common electrode line 20, and both of them are d4. In an embodiment of the present disclosure, d1:d2=kd3:d4, 0.8<k<1.2. It is preferable that k=1 is set, so as to ensure that an insulating capability of the slot in the first black matrix layer BM1 to the charges coupled to the first black matrix layer BM1 by the first common electrode line 20 is substantially the same or is the same in the row direction X and in the column direction Y of the dimming area Q11. Thus, even if the charges coupled to the first black matrix layer BM1 by the first common electrode line 20 enter the dimming area, an influence is the same in the row direction X and in the column direction Y of the dimming area, and a certain region of the dimming area is prevented as much as possible from being influenced prominently to cause abnormal display of the display panel 200.

It should be noted that, although two slots 300 are taken as an example for description, in a practical product, the number of the slots 300 depends on a width of the first common electrode line 20 in the peripheral area Q12, a size of the display module, and the like. Alternatively, one slot 300 may be formed. In the embodiment of the present disclosure, where a plurality of slots 300 is formed, it satisfies as long as the following conditions are met. For the slot 300 closest to the dimming area Q11, a distance between the first slot part 300a thereof and the first side a of the dimming area Q11 is equal to a distance between the second slot part 300d thereof and the second side b of the dimming area Q11, and the distance is d1. For the slot closest to the dimming area Q11, a minimum distance between the first slot part 300a thereof and the first common electrode line 20 is equal to a minimum distance between the second slot part 300b thereof and the first common electrode line 20, and the distance is d2. For the slot 300 closest to the dimming area Q11, a distance between the third slot part 300c thereof and the third side c of the dimming area Q11 is equal to a distance between the fourth slot part 300d thereof and the fourth side d of the dimming area Q11, and the distance is d3. For the slot 300 closest to the dimming area Q11, a minimum distance between the third slot part 300c thereof and the first common electrode line 20 is equal to a minimum distance between the fourth slot part 300d thereof and the first common electrode line 20, and the distance is d4. d1:d2=kd3:d4, 0.8<k<1.2.

For example, d1:d2=d3:d4, and a ratio is in a range of 4:1 to 6:1, preferably d1:d2=d3:d4=5:1. Alternatively, the ratio of d1:d2 (or d3:d4) may be specifically set according to the size of the display module.

In some embodiments, where a plurality of slots 300 is formed, and the plurality of slots 300 are disposed around the dimming area Q11, taking a rectangular display module as an example, a distance between two adjacent slots 300 in the row direction X is about 140 μm, and a distance between two adjacent slots 300 in the column direction Y is about 210 μm.

In some embodiments, a first alignment layer is disposed on a side of the first common electrode 020 on the first base substrate 11 of the light control panel 100, close to the first liquid crystal layer 300, a second alignment layer is disposed on a side of the first black matrix layer BM1 on the second base substrate 21 close to the first liquid crystal layer 300, and grooves are formed on the first alignment layer and the second alignment layer through a rubbing process, so that liquid crystal molecules of the first liquid crystal layer 30 have an initial arrangement direction. A signal connecting line for supplying an external signal to a dimming device in the dimming unit 01 is further disposed on the first base substrate 11 of the light control panel 100. In order to facilitate a routing of the signal connecting line, the signal connecting line may be formed by electrically connecting signal sub-lines in different layers together. In an embodiment of the present disclosure, the signal connecting line being formed by electrically connecting a first signal sub-line and a second signal sub-line in different layers together is taken as an example. For example, the first signal connecting sub-line and the gate of the first thin film transistor T1 are disposed in a same layer and made of a same material, and the second signal sub-line and the source and drain of the first thin film transistor T1 are disposed in a same layer and made of a same material. That is, the first signal sub-line and the gate of the first thin film transistor T1 are formed in one patterning process, and the second signal sub-line and the source and drain of the first thin film transistor T1 are fabricated in one patterning process. In this case, the first signal sub-line and the second signal sub-line need to be electrically connected to each other through a via penetrating the first gate insulating layer. A connecting position between the first signal sub-line and the second signal sub-line of the signal connection is located in the peripheral area Q12. Since the first signal sub-line and the second signal sub-line are located in different layers, two layers of structures need to be overlapped with each other at the electrically connected position between the first signal sub-line and the second signal sub-line, to realize the electrical connection. Thus, a thickness at the connecting position between the first signal sub-line and the second signal sub-line is made different from a thickness at other positions, thereby causing the grooves formed by rubbing the first alignment layer at this position to be abnormal compared with the grooves at other positions, and an arrangement of the liquid crystal molecules in this area is abnormal, so that the first black matrix layer BM1 is required to shield this part. Therefore, the slot 300 is required to bypass the connecting position between the first signal sub-line and the second signal sub-line in the embodiment of the present disclosure. That is, as shown in FIG. 10, the slot 300 is formed with a protrusion 310 corresponding to a connecting position between the first signal sub-line and the second signal sub-line, so that an orthographic projection of the connecting position between the first signal sub-line and the second signal sub-line on the first base substrate 11 and an orthographic projection of the slot 300 on the first base substrate 11 do not overlap each other.

In one example, the signal connecting line is configured to provide a common voltage signal to the first common electrode 020. In this case, the first signal sub-line of the signal connecting line may be the first common electrode line 20, and the second signal sub-line may be a first common voltage lead-in line. One end of the first common voltage lead-in line is connected to the first common electrode line 20, and the other end of the first common voltage lead-in line is connected to the first common electrode 020. In this case, an orthographic projection of the protrusion 310 of the slot 300 on the first base substrate 11 and an orthographic projection of the first common electrode line 20 on the first base substrate 11 overlap each other. That is, the protrusion 310 protrudes toward the side away from the dimming area Q11. Hereinafter, the first signal sub-line being a first common electrode line 20, and the second signal sub-line being a first common voltage lead-in line is taken as an example for description. In some embodiments, the orthographic projection of the slot 300 on the first base substrate 11 and an orthographic projection of the redundant dimming unit on the first base substrate 11 overlap each other. For example, the redundant dimming unit is located on a side of the first common electrode line 20 close to the dimming area Q11, and is adjacent to the first common electrode line 20. In the embodiment of the present disclosure, the orthographic projection of the slot 300 on the first base substrate 11 and the orthographic projection of the redundant dimming unit on the first base substrate 11 overlap each other, that is, the distance between the slot 300 and the first common electrode line 20 is short, so that the charges coupled to the first black matrix layer BM1 by the first common electrode line 20 may be effectively prevented from being conducted to the dimming area.

In some embodiments, a width of the slot in the first black matrix layer BM1 is greater than or equal to 18 μm. Alternatively, the width of the slot 300 may be specifically set according to the positions of the signal line, the dimming unit 01, the redundant dimming unit on the first base substrate 11, and the like.

Figure 11:
FIG. 11 is a schematic diagram of a display module according to an embodiment of the present disclosure.

In some embodiments, a width of the display area of the display panel 200 in the display module is less than a width of the light control panel 100, so as to prevent a deviation of an alignment precision between the display panel 200 and the light control panel 100 from affecting the normal display of the display panel 200. FIG. 11 is a schematic diagram of a display module according to an embodiment of the present disclosure. As shown in FIG. 11, a display panel 200 has a display area and a non-display area surrounding the display area. An orthographic projection of the display area on the first base substrate 11 is within an orthographic projection of the dimming area Q11 on the first base substrate 11. That is, a certain attachment tolerance (ΔXmax) is present between the display area of the display panel 200 and the dimming area Q11 of the light control panel 100.

In order to make the structure of the light control panel 100 in the embodiments of the present disclosure be described more clear, a structure of each layer in the first substrate of the light control panel 100 is specifically described below. The display module being a rectangular display module is taken as an example. In this case, the dimming area Q11 is rectangular, and the peripheral area Q12 is in a shape of a rectangular ring. The dimming unit 01 is located in the dimming area Q11, and the redundant dimming unit is located in the peripheral area Q12. A plurality of dimming units 01 and a plurality of redundant dimming units are arranged side by side in a column direction Y to form a plurality of first dimming unit groups 10a, and the dimming units 01 and the redundant dimming units in each of the plurality of first dimming unit groups 10a are arranged in a row direction X. The plurality of dimming units 01 and the plurality of redundant dimming units are arranged side by side in the row direction X to form a plurality of second dimming unit groups 10b, and the dimming units 01 and the redundant dimming units in each of the plurality of second dimming unit groups 10b are arranged in the column direction Y. The gates of the first thin film transistors T1 of the dimming units and the redundant dimming units in a same first dimming unit group 10a are connected to a same first gate line. The dimming units 01 and the redundant dimming units in a same second dimming unit group 10b are provided with data voltage signals through two first data lines, the sources of two first thin film transistor T1 which are adjacently arranged are connected to different first data lines, respectively. The first common electrodes 20 of the dimming units 01 and the redundant dimming units in a same second dimming unit group 10b are connected to a same first common voltage lead-in line.

In one example, the first substrate includes a first base substrate 11, and a first transparent conductive layer, a first metal conductive layer, a first gate insulating layer 12, an active semiconductor layer, a second metal conductive layer, a first interlayer insulating layer 13, and a second transparent conductive layer, which are sequentially disposed on the first base substrate 11. For example, the first transparent conductive layer may include, for example, a dimming electrode 010; the first metal conductive layer may include a first common electrode line 20, a first gate line, and a gate of the respective first thin film transistor T1; the active semiconductor layer includes an active layer of the respective first thin film transistor T1; the second metal conductive layer may include a source and a drain of the respective first thin film transistor T1, and a first data line; the second transparent conductive layer may include a first common electrode 020. The first transparent conductive layer, the first metal conductive layer, the first gate insulating layer 12, the active semiconductor layer, the second metal conductive layer, the first interlayer insulating layer 13, and the second transparent conductive layer will be specifically described below.

Figure 12:
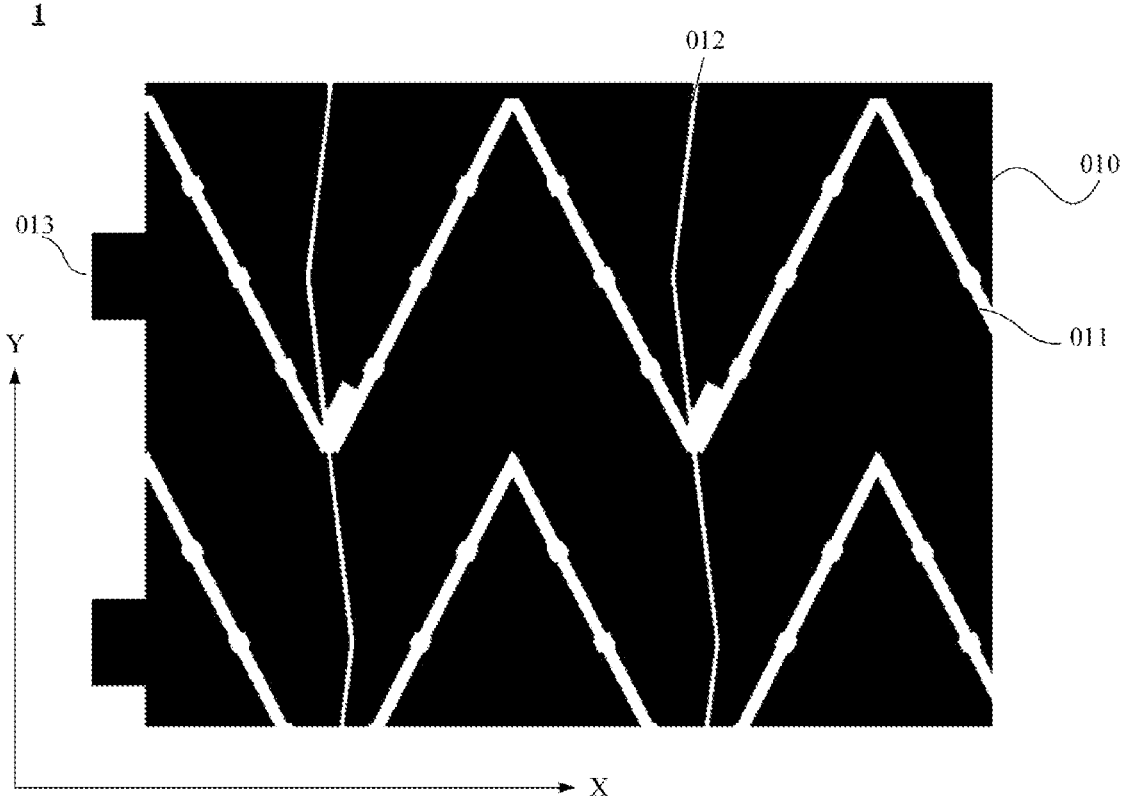
FIG. 12 is a schematic diagram of a first transparent conductive layer in a display module according to an embodiment of the present disclosure.

FIG. 12 is a schematic diagram of a first transparent conductive layer in a display module according to an embodiment of the present disclosure. For example, as shown in FIG. 12, the first transparent conductive layer 1 is disposed on the first base substrate 11, the first transparent conductive layer 1 includes a dimming electrode 010, and the dimming electrode 010 is located in the dimming area Q11 and a part of the peripheral area Q12. The dimming electrode 010 has a plurality of first openings 011 arranged side by side in the column direction Y and a plurality of second openings 012 arranged side by side in the row direction X. Each of the plurality of first openings 011 extends in the row direction X, and each of the plurality of second openings 012 extends in the column direction Y. The first opening 011 may be in a zigzag shape as shown in FIG. 12, and alternatively, the first opening 011 may be in other shape such as a straight line, and the shape of the first openings 011 is not particularly limited in the embodiments of the present disclosure. The first opening 011 is provided in the dimming electrode 010 to prevent a first gate line being electrically connected to the dimming electrode 010 when the first gate line is subsequently formed. The second opening 012 is provided in the dimming electrode 010 to prevent an orthographic projection of a subsequently formed first data line on the first base substrate 11 and an orthographic projection of the first common electrode 010 on the first base substrate 11 from overlapping each other to form an overlapping capacitor and influence a signal written to the first data line. It should be noted that the dimming electrodes 010 in the respective redundant dimming units may be connected together, while the dimming electrode 010 in the respective redundant dimming unit and the dimming electrode 010 in the dimming unit 01 are disconnected from each other, and the dimming electrodes 010 in the respective dimming units 01 are also disconnected from each other.

With continued reference to FIG. 12, the first transparent conductive layer 1 further includes a plurality of first connecting parts 013 disposed at intervals in the peripheral area Q12. Each first connecting part 013 is used to electrically connect the dimming electrode 010 in the redundant dimming unit to a first common electrode line 20 formed subsequently. The dimming electrode 010 and the first connecting part 013 in the redundant dimming unit may have a one-piece structure. The shape of the first connecting part 013 may be a rectangle as shown in FIG. 12, but may be other shape such as a circle, and is not limited herein.

Figure 13:
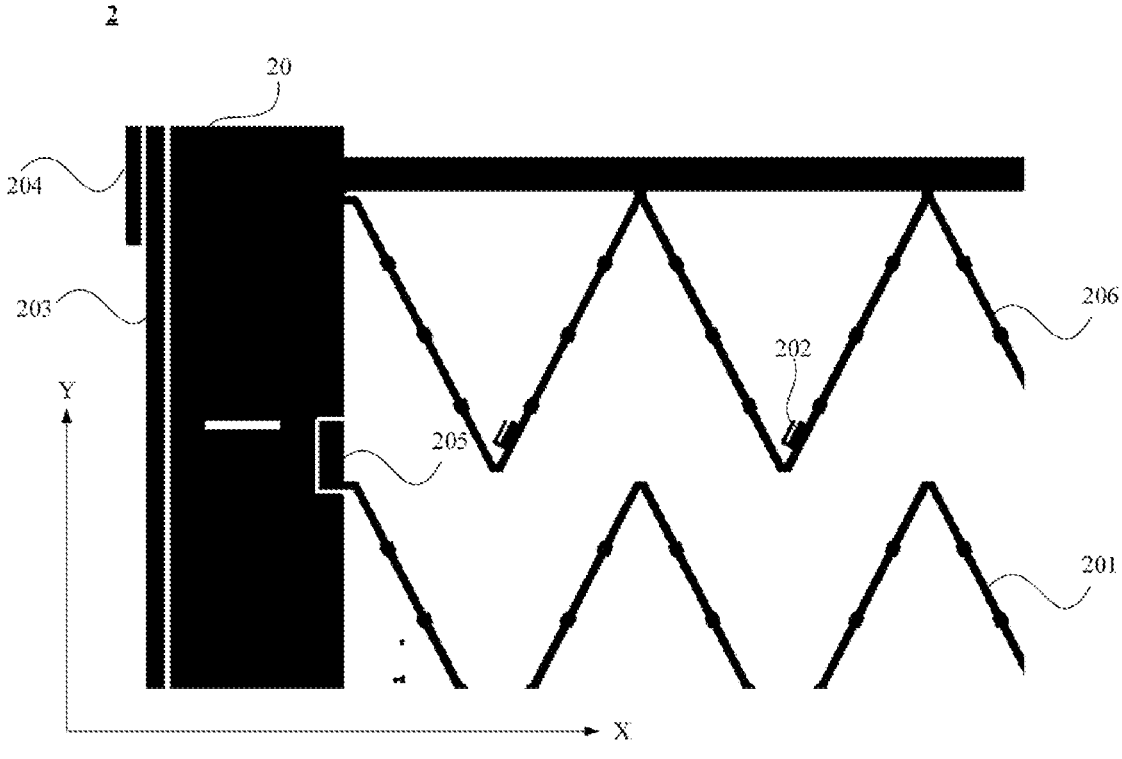
FIG. 13 is a schematic diagram of a first metal conductive layer in a display module according to an embodiment of the present disclosure.

FIG. 13 is a schematic diagram of a first metal conductive layer in a display module according to an embodiment of the present disclosure. For example, as shown in FIG. 13, the first metal conductive layer 2 is formed on the first transparent conductive layer 1. The first metal conductive layer 2 includes a plurality of first gate lines 201 arranged side by side in a column direction Y, and each of the plurality of first gate lines 201 extends in a row direction X. The first gate lines 201 are arranged in one-to-one correspondence with the first openings 011, and an orthographic projection of each first gate line 201 on the first base substrate 11 is within an orthographic projection of one first opening 011 on the first base substrate 11. The first metal conductive layer 2 further includes a gate 202 of the respective first thin film transistor T1, and the gate 202 of the first thin film transistor T1 is connected to the first gate line 201. The gate 202 of the first thin film transistor T1 and the first gate line 201 may have a one-piece structure. The first metal conductive layer 2 further includes a first common electrode line 20 located in the peripheral area Q12, and the first common electrode line 20 may be in a direct lap connection with the first connecting part 013 in the first transparent conductive layer 1 to electrically connect the first common electrode 010 and the first common electrode line 20 together.

With continued reference to FIG. 13, a second connecting part 205 is connected to an end of the first gate line 201, and the second connecting part 205 and the first gate line 201 may have a one-piece structure, so as to electrically connect a subsequently formed gate signal lead-in line to the first gate line 201.

With continued reference to FIG. 13, the first metal conductive layer 2 further includes a redundant gate line

206. Where only the redundant dimming units are included in the first dimming unit group 10a, the gate 202 of the first thin film transistor T1 in the redundant dimming unit is connected to the redundant gate line 206, and since the redundant dimming unit does not need to operate during displaying, the redundant gate line 206 and the first common electrode line 20 may be connected to form a one-piece structure.

It should be noted that, one side of the peripheral area Q12 is provided with a bonding area where a connecting pad is disposed for bonding with an external circuit such as COF, FPC, or PCB. The connecting pad also needs to be electrically connected to a respective signal lead-in line (fan-out lines) to supply a signal to respective signal line in the first substrate. Alternatively, the first substrate is further provided with a gate driving circuit (e.g., Gate On Array (GOA)), and the like. With reference to FIG. 13, the first substrate further includes a detection signal line 204 and a compensation signal line 203 disposed on the first base substrate 11 and located in the peripheral area Q12. The compensation signal line 203 and the detection signal line 204 are sequentially disposed on a side of the first common electrode line 20 away from the dimming area Q11. The detection signal line 204 is electrically connected to one first gate line 201 closest to the bonding area, and is used for detecting a gate signal. The compensation signal line 203 is used for compensating a signal input to the dimming unit 01.

Figure 14:
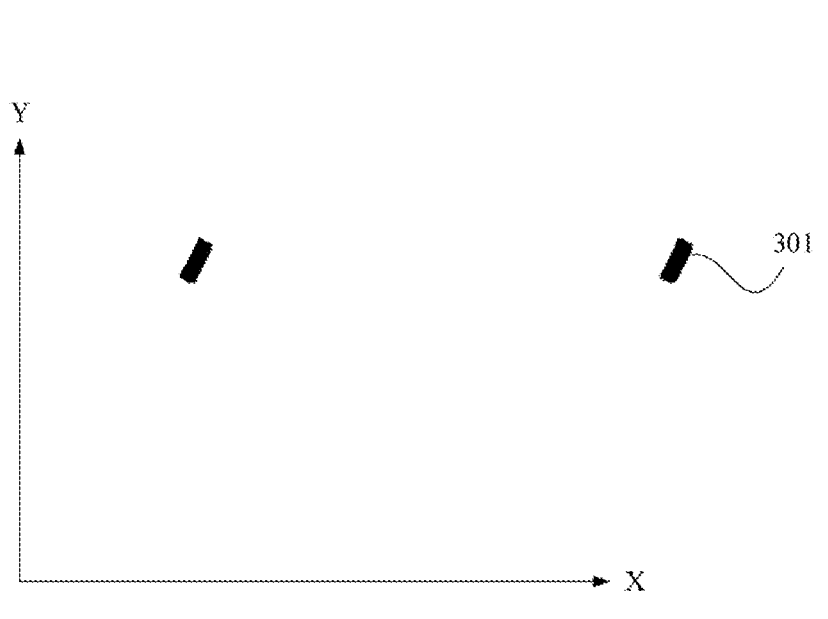
FIG. 14 is a schematic diagram of an active semiconductor layer in a display module according to an embodiment of the present disclosure.

For example, a first gate insulating layer 12 is formed on the first metal conductive layer 2, to insulate the first metal conductive layer 2 from an active semiconductor layer 3 formed subsequently. FIG. 14 is a schematic diagram of an active semiconductor layer in a display module according to an embodiment of the present disclosure. As shown in FIG. 14, the active semiconductor layer 3 includes an active layer 301 of the respective first thin film transistor T1, and an orthographic projection of the active layer 301 of the respective first thin film transistor T1 on the first base substrate 11 at least partially overlaps an orthographic projection of the gate 202 of the respective first thin film transistor T1 on the first base substrate 11, to realize a switching characteristic of the first thin film transistor T1. In addition, the active semiconductor layer may be made of amorphous silicon, polycrystalline silicon, an oxide semiconductor material, or the like.

Figure 15:
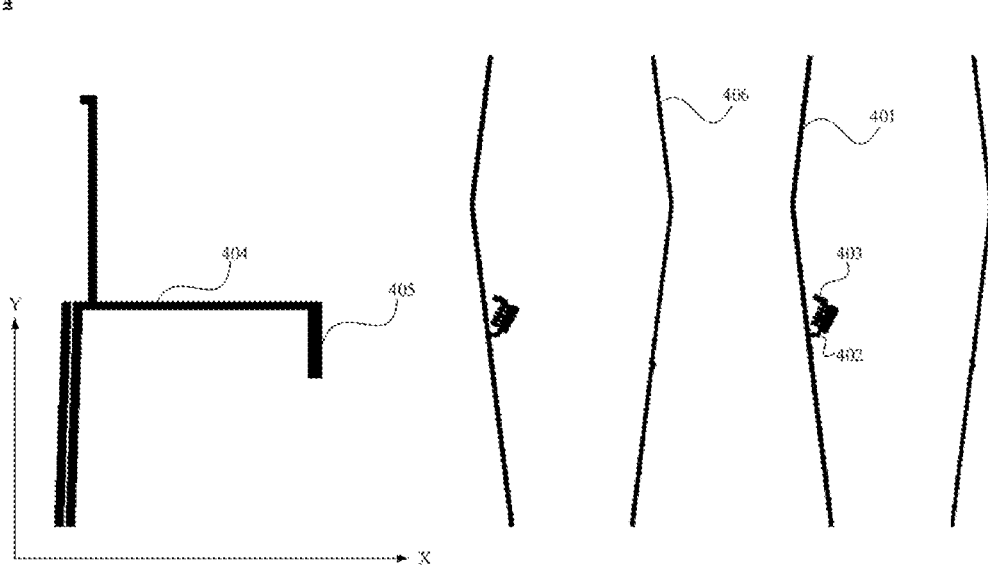
FIG. 15 is a schematic diagram of a second metal conductive layer in a display module according to an embodiment of the present disclosure.

For example, FIG. 15 is a schematic diagram of a second metal conductive layer in a display module according to an embodiment of the present disclosure. As shown in FIG. 15, the second metal conductive layer 4 is formed on the active semiconductor layer 3, the second metal conductive layer 4 includes a source 402 and a drain 403 of the respective first thin film transistor T1, and an orthographic projection of each of the source 402 and the drain 403 of the respective first thin film transistor T1 overlaps an orthographic projection of the active layer of the respective first thin film transistor T1 on the first base substrate 11, so that the source 402 and the drain 403 of the respective first thin film transistor T1 are electrically connected to the active layer 301 of the respective first thin film transistor T1. The second metal conductive layer 4 further includes a plurality of first data lines 401 disposed side by side in the row direction X, and each of the plurality of first data lines 401 extends in the column direction Y. The first data lines 401 are disposed in a one-to-one correspondence with the second openings 012 in the first common electrode 010, and an orthographic projection of each first data line 401 on the first base substrate 11 is within an orthographic projection of the second opening 012 corresponding to the first data line 401 in the first common electrode 010 on the first base substrate. The second metal conductive layer 4 further includes a plurality of first common voltage lead-in lines 406 arranged side by side in the row direction X, and each of the first common voltage lead-in lines 406 extends in the column direction Y. The first common voltage lead-in line 406 may be connected to the first common electrode line 20 through a third connecting electrode formed subsequently. Alternatively, each first common voltage lead-in line 406 is connected to the subsequently formed first common electrodes 020 in a same column. In one example, the first data lines 401 and the first common voltage lead-in lines 406 in the second metal conductive layer 4 are alternately arranged in the row direction X, so that the routing in the display substrate is more uniform, which helps to improve a uniformity of light output of the light control panel 100.

With reference to FIG. 15, a gate signal lead-in lines 404 located in the peripheral area Q12 is further disposed on the second metal conductive layer 4. One gate signal lead-in line 404 is connected to one first gate line 201, and each gate signal lead-in line 404 is further electrically connected to a gate driving circuit. Specifically, an end of the gate signal lead-in line 404 is connected to a third connecting part 405, the third connecting part 405 and the gate signal lead-in line 404 may have a one-piece structure, and the third connecting part 405 and the second connecting part 205 are electrically connected together, so as to realize an electrical connection between the gate signal lead-in line 404 and the first gate line 201.

In addition, as shown in FIG. 15, only the redundant dimming units are formed in the first dimming unit groups 10a in the peripheral area Q12, and the first gate line 301 (e.g., the first gate line 301 shown in FIG. 13) connected to the redundant dimming units in a first dimming unit group 10a in this area is connected to the first common electrode line 20. Why the first gate line 301 is connected to the first common electrode line 20 lies in that the redundant dimming unit does not need to work when the display module is displaying normally.

Figure 16:
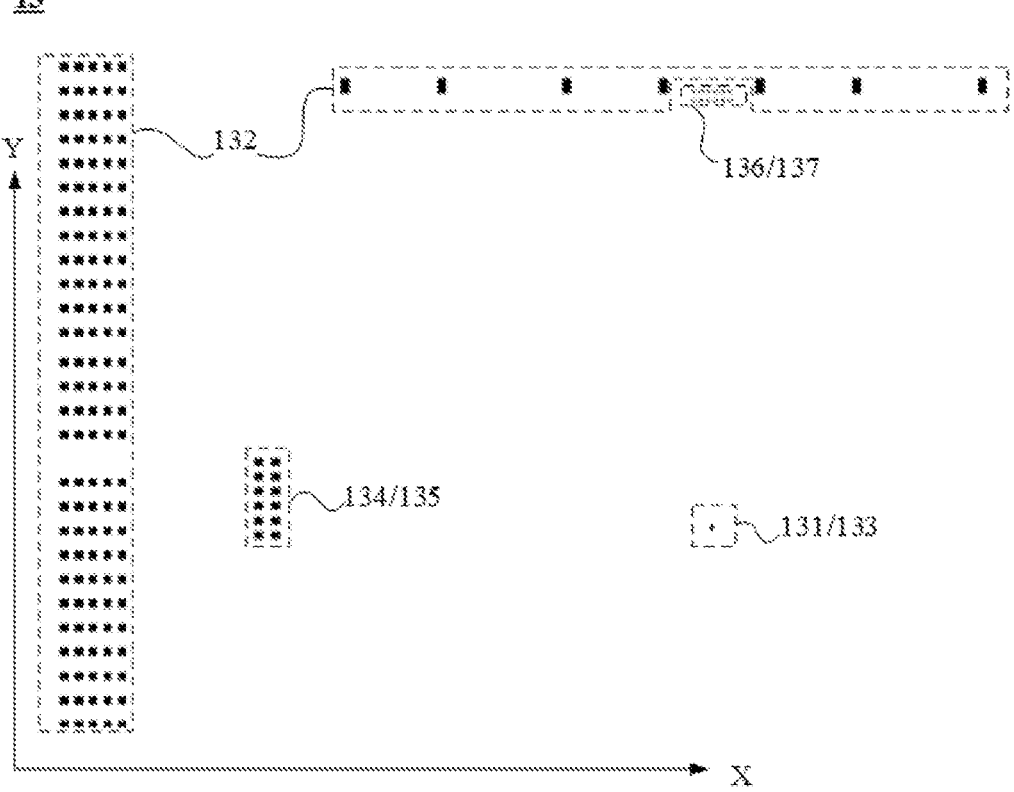
FIG. 16 is a schematic diagram of a distribution of vias in an interlayer insulating layer in a display module according to an embodiment of the present disclosure.

For example, a first interlayer insulating layer 13 is formed on the second metal conductive layer 4 to insulate the second metal conductive layer 4 from a second transparent conductive layer 5 formed subsequently. FIG. 16 is a schematic diagram of a distribution of vias in an interlayer insulating layer in a display module according to an embodiment of the present disclosure. As shown in FIG. 16, after the first interlayer insulating layer 13 is formed, the first gate insulating layer 12 and the first interlayer insulating layer 13 are etched to form a first connecting via 131, a second connecting via 132, and a fourth connecting via 134, and to form a third connecting via 133 and a fifth connecting via 135 penetrating the first interlayer insulating layer. The first connecting via 131 and the third connecting via 133 are used to electrically connect the dimming electrode 010 and the drain 403 of the first thin film transistor T1 by a first connecting electrode 14 formed subsequently. The second connecting via is used to electrically connect a subsequently formed first common electrode 020 to the first common electrode line 20. The fourth connecting via 134 and the fifth connecting via 135 are used to electrically connect the second connecting part 205 and the third connecting part 405 by a subsequently formed second connecting electrode, to realize an electrical connection between the signal connecting first gate line 201 and the gate signal lead-in line 401.

With reference to FIG. 16, since a width of each of two parts of the first common electrode line 20 opposite to each other in the row direction X is greater than a width of each of two parts of the first common electrode line 20 opposite to each other in the column direction Y, the second connecting vias 132 at a position of each of the two parts of the first common electrode line 20 opposite to each other in the row direction X may be arranged in an array, so that the subsequently formed first common electrodes 020 is reliably connected to the first common electrode line 20.

In addition, in this case, the first substrate further includes a sixth connecting via 136 penetrating the first gate insulating layer 12 and the first interlayer insulating layer 13 and a seventh connecting via 137 penetrating the first interlayer insulating layer 13. The sixth connecting via 136 and the seventh connecting via 137 are used to electrically connect the first common electrode line 20 and the first common voltage lead-in line 406 by a subsequently formed third connecting electrode in the second transparent conductive layer (i.e., a position corresponding to the protrusion 310 in FIG. 10).

Figure 17:
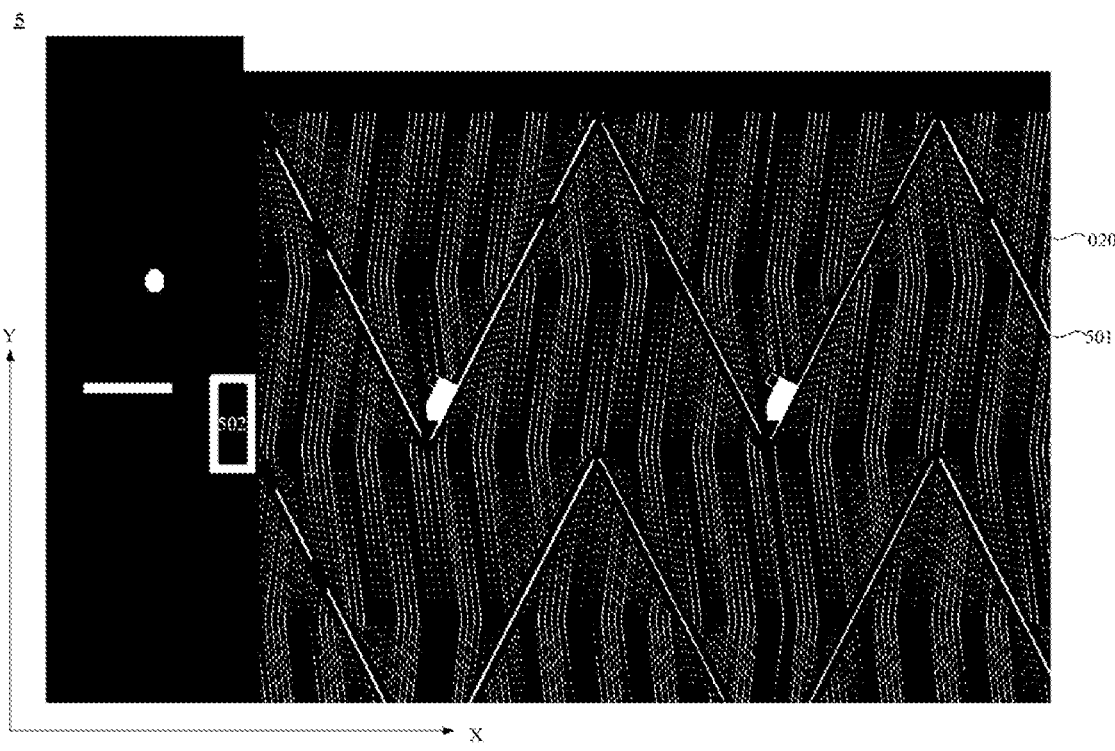
FIG. 17 is a schematic diagram of a second transparent conductive layer in a display module according to an embodiment of the present disclosure.

FIG. 17 is a schematic diagram of a second transparent conductive layer in a display module according to an embodiment of the present disclosure. For example, as shown in FIG. 17, the second transparent conductive layer 5 is formed on the interlayer insulating layer 13, and the second transparent conductive layer 5 includes first common electrodes 020 of the respective dimming unit 01 and the respective redundant dimming unit, a first connecting electrode 14, and a second connecting electrode 502. A plurality of third openings 501 arranged side by side in the column direction Y are formed in the first common electrode 020, and each third opening 501 extends in the row direction X. The third opening 501 is disposed corresponding to the first gate line 201, and an orthographic projection of the first gate line 201 on the first base substrate 11 is within an orthographic projection of the third opening 501 on the first base substrate 11, so as to prevent the first gate line 201 and the first common electrode 020 from forming a coupling capacitor.

Figure 18:
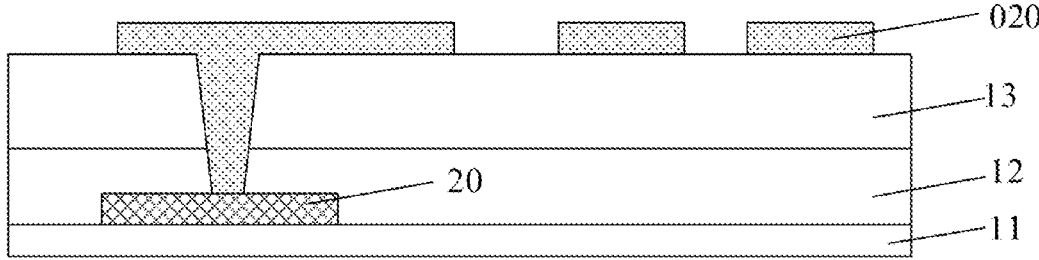
FIG. 18 is a schematic diagram of a connection between a first common electrode and a first common electrode line in a display module according to an embodiment of the present disclosure.
Figure 19:
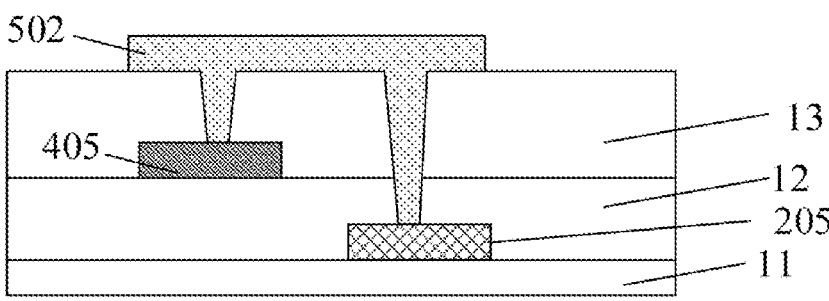
FIG. 19 is a schematic diagram of a connection between a second connecting part and a third connecting part in a display module according to an embodiment of the present disclosure.

Referring to FIG. 4, the first connecting electrode 14 electrically connects the dimming electrode 010 and the drain 403 of the first thin film transistor T1 together through the first connecting via 131 and the third connecting via 133. FIG. 18 is a schematic diagram of a connection between a first common electrode and a first common electrode line in a display module according to an embodiment of the present disclosure. As shown in FIG. 18, the first common electrode 020 is electrically connected to the first common electrode line 20 through the second connecting via 132. Generally, a width of the second connecting part 205 is greater than that of the first gate line 201, a plurality of fourth connecting vias 134 and fifth connecting vias 135 may be disposed at the position of each second connecting part 205, and a plurality of fourth connecting vias 134 and fifth connecting vias 135 may be arranged in an array, so as to realize a reliable connection between the gate signal lead-in line 404 and the second connecting part 205. FIG. 19 is a schematic diagram of a connection between a second connecting part and a third connecting part in a display module according to an embodiment of the present disclosure. As shown in FIG. 19, the second connecting electrode 502 electrically connects the second connecting part 205 and the third connecting part 405 through the fourth connecting via 134 and the fifth connecting via 135, so as to electrically connect the signal connecting first gate line 201 and the gate signal lead-in line 401. Alternatively, a third connecting electrode is further included in the second transparent conductive layer 5, and the third connecting electrode electrically connects the first common electrode line 20 and the first common voltage lead-in line 406 together through the sixth connecting via 136 and the seventh connecting via 137.

It should be noted that, the orthographic projection of the first common electrode 020 in the second transparent conductive layer 5 on the first base substrate 11 covers the orthographic projection of the first data line 401 on the first base substrate 11. Since the voltage input to the first common electrode 020 during operation is a constant voltage, the first common electrode 401 is covered by the first common electrode, which is equivalent to a shielding electrode of the first data line 401, and the problem of light leakage caused by ineffective deflection of the liquid crystal molecules at the position of the first data line 401 can be effectively avoided.

At this point, the introduction of the respective film layer in the first substrate is completed.

Figure 20:
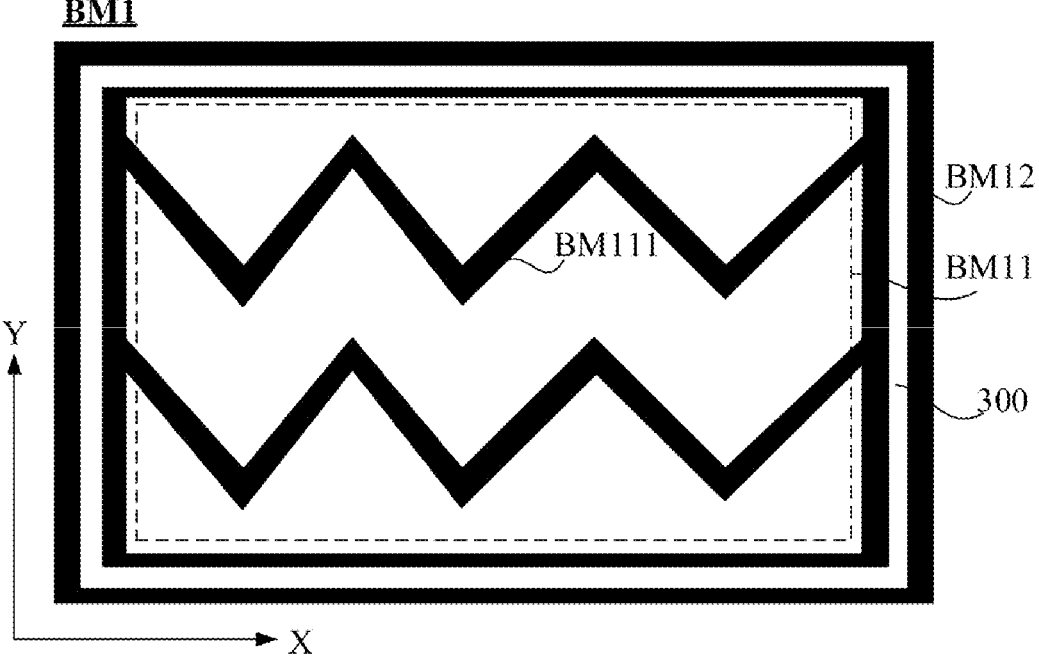
FIG. 20 is a schematic diagram of another first black matrix layer of a light control panel in a display module according to an embodiment of the present disclosure.

For the above described first substrate, a first black matrix layer BM1 corresponding to the first substrate is provided. In the above described first substrate, the first common electrode 020 in the second transparent conductive layer 5 is equivalent to the shielding electrode of the first data line 401, so that a shielding part is not required to be disposed at the position of the first data line 401 for blocking light. FIG. 20 is a schematic diagram of another first black matrix layer of a light control panel in the display module according to an embodiment of the present disclosure. As shown in FIG. 20, the first black matrix layer BM1 includes a first light shielding part BM11 located in the dimming area Q11 and a second light shielding part BM12 located in the peripheral area Q12. The first light shielding part BM11 includes a plurality of light shielding sub-parts BM111 arranged side by side in the column direction Y, and each light shielding sub-part BM111 extends in the row direction X. An orthographic projection of each light shielding sub-part BM111 on the first base substrate 11 covers an orthographic projection of one first gate line 301 on the first base substrate 11, and the light shielding sub-part BM111 is used for blocking light at the position corresponding to the first gate line 201. In one example, if the first gate line 201 is in a zigzag shape such as serrated shape, S-shaped wave, etc., the light shielding sub-part also takes the same shape. The second light shielding part BM112 in the peripheral area Q12 of the first black matrix layer BM1 has an annular slot 300, and the second light-shielding portion BM12 is opaque except for the position of the slot 300.

In a second aspect, an embodiment of the present disclosure provides a display apparatus, including the above described display module. Alternatively, a backlight or the like may be included.

It should be noted that, the display apparatus provided in the embodiment of the present disclosure may be any product or component with a display function, such as a flexible wearable device, a mobile phone, a tablet computer, a television, a monitor, a notebook computer, a digital photo frame, a navigator or the like. Other essential components of the display apparatus are understood by those skilled in the art, and are not described herein or should not be construed as limiting the present disclosure.

It will be understood that the above embodiments are merely exemplary embodiments adopted to illustrate the principles of the present disclosure, and the present disclosure is not limited thereto. It will be apparent to one of ordinary skill in the art that various modifications and improvements can be made without departing from the spirit and scope of the present disclosure, and such modifications and improvements are also considered to be within the scope of the present disclosure.

What is claimed is:

1. A light control panel, provided with a dimming area and a peripheral area surrounding the dimming area; wherein the light control panel comprises a first substrate and a second substrate opposite to each other, and a first liquid crystal layer between the first substrate and the second substrate, wherein the first substrate comprises:

a first base substrate; and a signal transmission line, which is on a side of the first base substrate close to the first liquid crystal layer and is in the peripheral area, the second substrate comprises:

a second base substrate; and a first black matrix layer, which is on a side of the second base substrate close to the first liquid crystal layer and is in the dimming area and the peripheral area, wherein the first black matrix layer is provided with a slot in the peripheral area, and an orthographic projection of at least a part of the slot on the first base substrate is on a side of an orthographic projection of the signal transmission line on the first base substrate, close to the dimming area, wherein the first substrate further comprises a signal connecting line on the first base substrate; the signal connecting line comprises a first signal sub-line and a second signal sub-line which are electrically connected together and in different layers; a connecting position between the first signal sub-line and the second signal sub-line is in the peripheral area; and the slot at a position corresponding to the connecting position between the first signal sub-line and the second signal sub-line is formed with a protrusion, and an orthographic projection of the slot on the first base substrate overlaps an orthographic projection of the first signal sub-line on the first base substrate, wherein the first signal sub-line comprises a first common electrode line, and the second signal sub-line comprises a first common voltage lead-in line; one end of the first common voltage lead-in line is connected to the first common electrode line, and the other end of the first common voltage lead-in line is connected to a first common electrode; and an orthographic projection of the protrusion on the first base substrate overlaps an orthographic projection of the first common electrode line on the first base substrate.

2. The light control panel according to claim 1, wherein the slot comprises a continuous pattern surrounding the dimming area.

3. The light control panel according to claim 2, wherein the first black matrix layer is provided with at least one of the slot, the signal transmission line is around the dimming area, the dimming area comprises a first side and a second side opposite to each other in a first direction, and a third side and a fourth side opposite to each other in a second direction;

each of the at least one slot comprises a first slot part and a second slot part opposite to each other in the first direction, and a third slot part and a fourth slot part opposite to each other in the second direction;

a distance between the first slot part of a slot of the at least one slot closest to the dimming area and the first side of the dimming area is equal to a distance between the second slot part of the slot closest to the dimming area and the second side of the dimming area, and the distance is d1;

a minimum distance between the first slot part of the slot closest to the dimming area and the signal transmission line is equal to a minimum distance between the second slot part of the slot closest to the dimming area and the signal transmission line, and the minimum distance is d2;

a distance between the third slot part of the slot closest to the dimming area and the third side of the dimming area is equal to a distance between the fourth slot part of the slot closest to the dimming area and the fourth side of the dimming area, and the distance is d3; and a minimum distance between the third slot part of the slot closest to the dimming area and the signal transmission line is equal to a minimum distance between the fourth slot part of the slot closest to the dimming area and the signal transmission line, and the minimum distance is d4;

wherein d1: d2=kd3: d4, and k is greater than 0.8 and less than 1.2.

4. The light control panel according to claim 3, wherein d1: d2 is in a range from 4:1 to 6:1.

5. The light control panel according to claim 1, wherein the signal transmission line comprises a first common electrode line.

6. The light control panel according to claim 5, wherein the first substrate further comprises:

a plurality of dimming units and a plurality of redundant dimming units, both of which are on a side of the first base substrate close to the first liquid crystal layer, wherein the plurality of dimming units are in the dimming area, and the plurality of redundant dimming units are in the peripheral area; the plurality of dimming units and the plurality of redundant dimming units comprise a first thin film transistor, a dimming electrode, and a first common electrode, which are on the first base substrate; and the dimming electrode of the redundant dimming unit is electrically connected to the first common electrode.

7. The light control panel according to claim 6, wherein an orthographic projection of the slot on the first base substrate overlaps an orthographic projection of the redundant dimming unit on the first base substrate.

8. The light control panel according to claim 6, wherein the plurality of dimming units and the plurality of redundant dimming units are arranged side by side in a second direction to form a plurality of first dimming unit groups, the dimming units and the redundant dimming units in each of the plurality of first dimming unit groups are arranged in a first direction; the plurality of dimming units and the plurality of redundant dimming units are arranged side by side in a first direction to form a plurality of second dimming unit groups, and the dimming units and the redundant dimming units in each of the plurality of second dimming unit groups are arranged in the second direction; gates of the first thin film transistors of the dimming units and the redundant dimming units in a same first dimming unit group are connected to a same first gate line; the dimming units and the redundant dimming units in a same second dimming unit group are provided with data voltages through two first data lines, and sources of two adjacent first thin film transistors are connected to the two first data lines, respectively;

the first substrate further comprises:

a first transparent conductive layer on a side of the first base substrate close to the first liquid crystal layer, wherein the first transparent conductive layer comprises the dimming electrode; the dimming electrode comprises a plurality of first openings arranged side by side in the second direction, and each of the plurality of first openings extends in the first direction;

a first metal conductive layer on a side of the first base substrate close to the first liquid crystal layer, wherein the first metal conductive layer comprises a plurality of first gate lines arranged side by side in the second direction, the gates of the first thin film transistors and the common electrode line, each of the plurality of first gate lines extends in the first direction;

a first gate insulating layer on a side of the first metal conductive layer away from the first base substrate;

an active semiconductor layer on a side of the first gate insulating layer away from the first metal conductive layer, wherein the active semiconductor layer comprises an active layer of the respective first thin film transistor;

a second metal conductive layer on a side of the active semiconductor layer away from the first gate insulating layer, wherein the second metal conductive layer comprises a plurality of first data lines arranged side by side in the first direction, and a source and a drain of the respective first thin film transistor, and the source and the drain of the respective first thin film transistor are connected to the active layer; and each of the plurality of first data lines extends in the second direction;

a first interlayer insulating layer on a side of the second metal conductive layer away from the first gate insulating layer, wherein the first substrate further comprises a first connecting via, a second connecting via and a third connecting via, wherein the first connecting via and the second connecting via each penetrate the first interlayer insulating layer and the first gate insulating layer, and the third connecting via penetrates the first interlayer insulating layer; and a second transparent conductive layer on a side of the first interlayer insulating layer away from the second metal conductive layer, wherein the second transparent conductive layer comprises the first common electrodes of a respective dimming unit and a respective redundant dimming unit, and a first connecting electrode; the first connecting electrode electrically connects the drain of the first thin film transistor and the dimming electrode through the first connecting via; and the first common electrode is electrically connected to the first common electrode line through the second connecting via.

9. The light control panel according to claim 8, wherein the first black matrix layer comprises a first light shielding part in the dimming area and a second light shielding part in the peripheral area; and the first light shielding part comprises a plurality of light shielding sub-parts arranged side by side in the second direction, each of the plurality of light shielding sub-parts extends in the first direction; and an orthographic projection of each of plurality of light shielding sub-parts on the first base substrate covers an orthographic projection of one of the plurality of first gate lines on the first base substrate.

10. The light control panel according to claim 8, wherein the dimming electrode further comprises a plurality of second openings arranged side by side in the first direction, each of the plurality of second openings extends in the second direction; and an orthographic projection of each of the plurality of first data lines on the first base substrate is within an orthographic projection of one of the plurality of second openings on the first base substrate.

11. The light control panel according to claim 8, wherein the second transparent conductive layer further comprises a plurality of third openings formed in the first common electrode and arranged side by side in the second direction; each of the plurality of third openings extends in the first direction, and an orthographic projection of the third opening on the first base substrate at least partially overlaps an orthographic projection of the first gate line on the first base substrate.

12. The light control panel according to claim 8, wherein the first transparent conductive layer further comprises a plurality of first connecting parts disposed at intervals, and each of the plurality of first connecting parts is electrically connected to the dimming electrode in the redundant dimming unit and is in a direct lap connection with the first common electrode line.

13. The light control panel according to claim 8, wherein the first substrate further comprises a gate driving circuit on the first base substrate and in the peripheral area, and a plurality of gate signal lead-in lines, a detection signal line, and a compensation signal line, which are connected to the gate driving circuit; each of the plurality of gate signal lead-in lines is connected to one of the plurality of first gate lines; and the detection signal line is connected to one of the plurality of first gate lines;

the first metal conductive layer further comprises the detection signal line and the compensation signal line; and the second metal conductive layer further comprises the plurality of gate signal lead-in lines.

14. The light control panel module according to claim 13, wherein a second connecting part is connected to an end of the first gate line, and a third connecting part is connected to an end of the gate signal lead-in line; the second transparent conductive layer further comprises a second connecting electrode; the first substrate further comprises a fourth connecting via penetrating the first gate insulating layer and the first interlayer insulating layer, and a fifth connecting via penetrating the first interlayer insulating layer; the second connecting electrode electrically connects the second connecting part and the third connecting part together through the fourth connecting via and the fifth connecting via.

15. The light control panel according to claim 8, wherein the first metal conductive layer further comprises a redundant gate line extending in a first direction, and the redundant gate line is connected to the first common electrode line; at least one of the plurality of first dimming unit groups comprises only the redundant dimming units, and the gate of the first thin film transistor in this first dimming unit group is connected to the redundant gate line.

16. The light control panel according to claim 1, wherein a width of the slot is greater than or equal to 18 μm.

17. The light control panel according to claim 1, wherein the display panel comprises a third substrate and a fourth substrate opposite to each other, and a second liquid crystal layer between the third substrate and the fourth substrate; the third substrate is on a side of the second substrate away from the first liquid crystal layer; the display panel is provided with a display area and a non-display area surrounding the display area; and an orthographic projection of the display area on the first base substrate is within an orthographic projection of the dimming area on the first base substrate.

18. A display module, comprising a display panel and the light control panel according to claim 1, which are stacked together.

19. A display apparatus, comprising the display module according to claim 18.

* * * * *